(12) United States Patent
Kochsiek

(10) Patent No.: US 8,561,774 B2
(45) Date of Patent: Oct. 22, 2013

(54) CLUTCH

(75) Inventor: Guido Kochsiek, Leopoldshöhe (DE)

(73) Assignee: IPROTEC Maschinen-und Edelstahlprodukte GmbH, Petershagen-Friedewalde (DE)

( * ) Notice: Subject to any disclaimer, the term of this patent is extended or adjusted under 35 U.S.C. 154(b) by 412 days.

(21) Appl. No.: 12/933,351

(22) PCT Filed: Mar. 19, 2009

(86) PCT No.: PCT/EP2009/002025
§ 371 (c)(1),
(2), (4) Date: Nov. 24, 2010

(87) PCT Pub. No.: WO2009/115327
PCT Pub. Date: Sep. 24, 2009

(65) Prior Publication Data
US 2011/0192696 A1   Aug. 11, 2011

(30) Foreign Application Priority Data
Mar. 20, 2008   (EP) ...................... 08005325

(51) Int. Cl.
*F16D 25/04*   (2006.01)
*F16D 11/04*   (2006.01)

(52) U.S. Cl.
USPC ................ 192/85.11; 192/69.5; 192/85.18; 192/108

(58) Field of Classification Search
USPC ........... 192/85.11, 85.18, 69.5, 56.33; 464/36
See application file for complete search history.

(56) References Cited

U.S. PATENT DOCUMENTS

| 2,683,362 | A | * | 7/1954 | Bowman ......................... 464/36 |
| 3,177,740 | A | * | 4/1965 | Firestone et al. ............... 74/826 |
| 4,960,192 | A | * | 10/1990 | Kurihara ..................... 192/85.11 |
| 2002/0112934 | A1 | | 8/2002 | Karambelas et al. |
| 2002/0168222 | A1 | | 11/2002 | Simons et al. |

FOREIGN PATENT DOCUMENTS

| DE | 33 39 186 C1 | 3/1985 |
| DE | 20 2005 005 513 U1 | 8/2006 |
| EP | 1 225 356 A1 | 7/2002 |
| GB | 16521 A | 0/1913 |

* cited by examiner

Primary Examiner — Rodney Bonck
(74) Attorney, Agent, or Firm — Sughrue Mion, PLLC

(57) ABSTRACT

The invention relates to a clutch having a first clutch part (2) and a second clutch part (3), wherein said two clutch parts (2, 3) are disposed pivotably relative to one another. In order to propose a clutch which in particular allows a precisely-positioned location fixing of the two clutch parts (2, 3) to one another, a clutch (1) is proposed by the invention which is characterized by a clutch element (4), which can be positioned rotationally-fixed relative to one of the two clutch parts (3), wherein the other of said two clutch parts (2) has a clutch member (6), which works together with a clutch member (7) carried by said clutch element (4).

7 Claims, 5 Drawing Sheets

Fig. 6
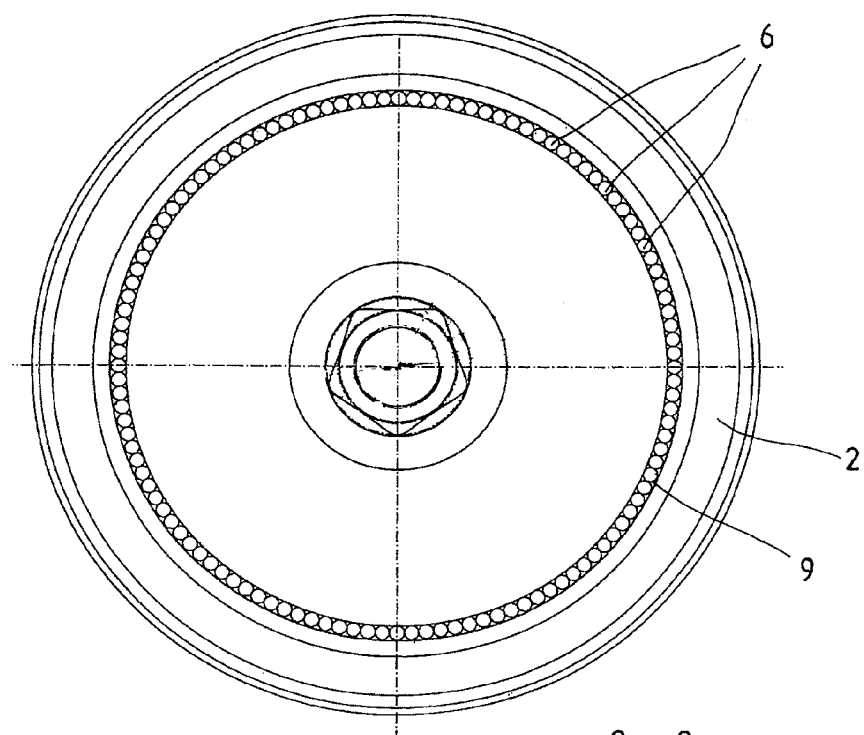
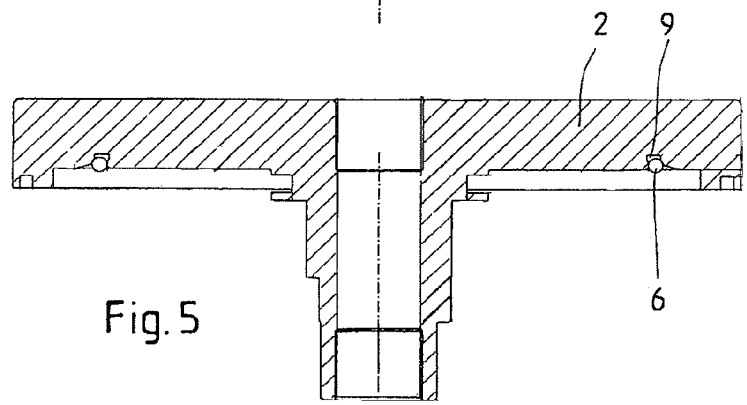
Fig. 5

Fig. 8
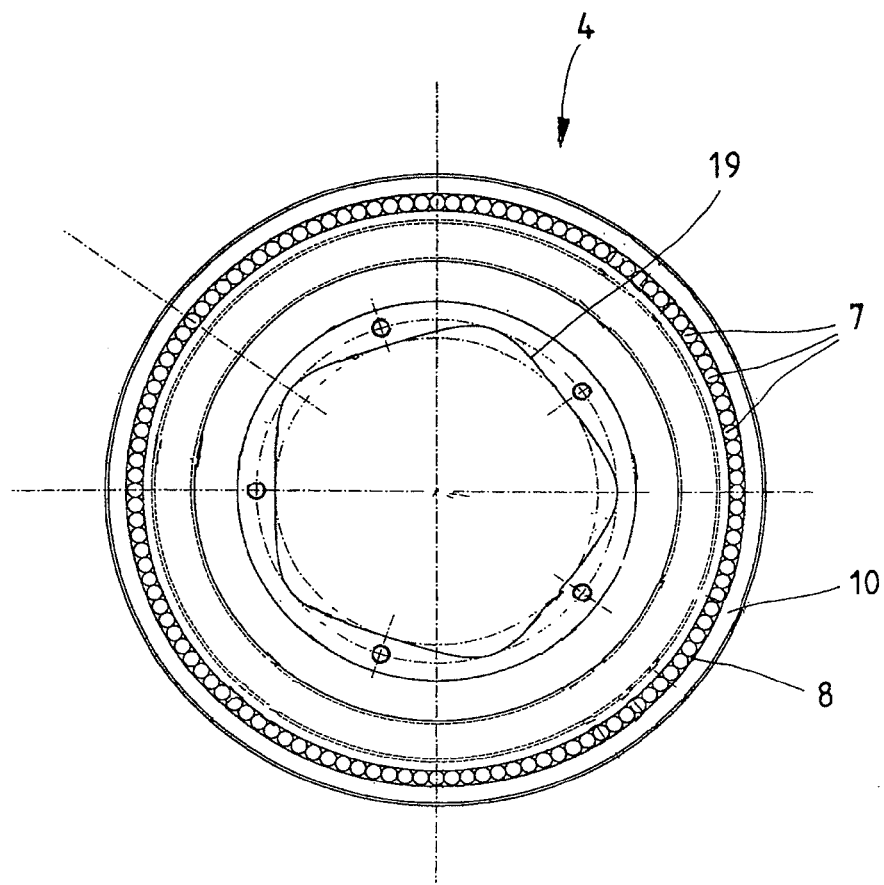
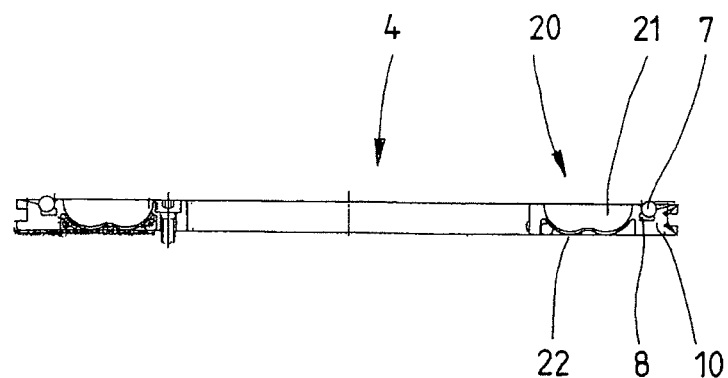
Fig. 7

US 8,561,774 B2

CLUTCH

CROSS REFERENCE TO RELATED APPLICATIONS

This application is a National Stage of International Application No. PCT/EP2009/002025 filed Mar. 19, 2009, claiming priority based on European Patent Application No. 08005325.9 filed Mar. 20, 2008, the contents of all of which are incorporated herein by reference in their entirety.

The invention relates to a clutch having a first clutch part and a second clutch part, wherein the two clutch parts are disposed rotatably relative to one another.

Clutches serve for the fixed or mobile, rigid or resilient-elastic and, if technically required, the engaging and disengaging connection of shafts and also other components for the transmission of torques. They are sufficiently known in the state of the art, such that no separate evidence by means of publications is required here.

Although numerous clutch constructions especially adapted to respective application cases are known from the state of the art, there is still a demand for improvements. Therefore, it is the object of the invention to propose a new clutch which in particular permits a precisely-positioned location fixing of the two clutch parts with respect to each other.

For the solution of this problem the invention proposes a clutch which is characterized by a clutch element which can be positioned rotationally-fixed relative to one of the two clutch parts, wherein the other one of the two clutch parts has a clutch member which cooperates with a clutch member carried by the clutch element.

The clutch according to the invention comprises a first clutch part, a second clutch part as well as a clutch element. The clutch element can be for example positioned rotationally-fixed with respect to the second clutch part. This is preferably achieved in that the clutch element is disposed at the second clutch part. Advantageously it is proposed that a polygonal connection is provided for a rotationally-fixed connection between the clutch element on the one hand and the second clutch part on the other hand. Due to this polygonal connection the clutch element will be entrained during a torsional movement of the second clutch part. Other rotationally-fixed connections are comprised in the scope of the invention.

The clutch according to the invention furthermore comprises clutch members, wherein a first clutch member is carried by the first clutch part and a second clutch member is carried by the clutch element. These clutch members cooperate and can be, in case of need, brought into interlocking and/or non-positive engagement for the load transmission between the first clutch part and the second clutch part.

The special advantage of the clutch according to the invention is that a load transmitting connection between the first clutch part and the second clutch part is realized in a quasi indirect manner via the clutch members, which permits a precisely-positioned location fixing of the two clutch parts with respect to each other. In this connection it is also an advantage that a deterioration caused by wear only concerns the clutch members which can be easily replaced in case of need. Thus, the clutch according to the invention shows an extremely long service life, if worn-out clutch members are duly replaced in the course of regular maintenance works.

Preferably, a plurality of clutch members is used both in connection with the clutch parts and the clutch elements. These clutch members are advantageously balls and inserted into grooves which are provided for this purpose both in the clutch part and in the clutch element. Herein, the groove length corresponds to a multiple of the diameter of the balls used as clutch members, such that the groove is completely filled up with the balls serving as clutch members without forming any clearances. In the due application case the clutch members can be brought into mutual engagement for a load transmitting coupling between the first clutch part and the second clutch part. If the clutch members are not engaged with each other, the two clutch parts can be rotated relative to each other. However, as soon as the clutch members are in engagement, a rotationally fixed connection between the two clutch parts is achieved. Similar to a tooth system, an engagement of the clutch members, i.e. a load transmitting connection between the clutch parts is obtained, if the balls serving as clutch members are offset by half a ball diameter, i.e. pressed against each other on gaps, such that two first clutch members of the first clutch part receive a second clutch member of the clutch element between them or vice versa, which means that two second clutch members of the clutch element receive a first clutch member of the first clutch part between them.

Thanks to the previously described arrangement it is advantageously possible to position both clutch parts in an extremely precisely-positioned manner in their relative location with respect to each other and to form a load transmitting connection between the two clutch parts in this location. If according to the preferred embodiment balls are used as clutch members, the positioning accuracy of the two clutch parts with respect to each other is defined as a function of half the diameter of the balls used as clutch members. Therefore, the possible position accuracy of the two clutch parts can be advantageously pre-determined in a purely constructional way, in that correspondingly dimensioned balls are used as clutch members.

The clutch element provided according to the invention serves for pressing the clutch members against each other in the case of engagement. The clutch element has a radial external marginal area and a radial internal area. An annular resilient-elastic area is formed between both of them. For this reason, the external marginal area on the one hand and the internal area on the other hand can be displaced relative to each other in axial direction. Thus, the clutch members can be disposed on the external marginal area or on the internal area. The already described groove can be for example adapted to receive the ball elements. But there can also be other clutch members, such as frictional surfaces, cams/grooves, tooth systems and the like. Due to the resilient-elastic design it is possible to displace the external marginal area and the internal area relative to each other. There are combinations, in which the internal area is disposed rotationally-fixed with respect to one of the clutch elements. In this case, the external marginal area can be displaced with respect to the other clutch via the resilient-elastic area by means of corresponding pressurization. This can also be vice versa, i.e. the external marginal area can be fixed with respect to one clutch element and the internal area can be axially displaced in a resilient-elastic manner. A combination is also possible, in that both areas are displaced relative to each other by means of the pressure and then brought into engagement with the respective clutch elements. All combinations are also imaginable, i.e. an engagement is realized during pressurization or if the pressure is stopped. In the assembled state of the clutch it is possible, thanks to the described arrangement, to displace the clutch members carried by the clutch element into the direction towards the clutch members carried by the clutch part and again away from them. Herein, it can be a matter of clutch members which are axially disposed in the marginal area, but also clutch members which are disposed in the radial front marginal area and engage in corresponding radially disposed counterparts.

The force impingement of the clutch element for displacing or horizontally swinging the radial external marginal area is preferably realized hydraulically or pneumatically. But also electric, electro-magnetic or like force effects are comprised within the scope of the invention. In this connection it is structurally provided that the second clutch part has a receiver which is corresponding to the clutch element, in which receiver the clutch element is inserted in a fluid tight manner in the finally assembled state of the clutch according to the invention. The clutch part receiving the clutch element furthermore comprises pressure chambers which are directly adjacent to the clutch element received by the clutch part. Instead of several pressure chambers, only one pressure chamber can also be provided which is for example annular or loop-shaped corresponding to the design of the clutch element. If in the operation case a certain minimum pressure is generated in the pressure chamber, a lifting of the resilient-elastic radial external marginal area of the clutch element will be caused, namely in the direction towards the first clutch part. As soon as the pressure decreases again beneath the certain minimum pressure, the radial external marginal area of the clutch element also sinks again due to the resilient-elastic design thereof until the clutch element regains its normal position in the receiver of the second clutch part.

In the case of an electric or electro-magnetic operation, coils or other suitable components are for example disposed in the corresponding areas.

As it should have become apparent from the above description, the first and the second clutch part are spaced from each other in axial direction. This distance is structurally pre-determined and results as a function of the size of the clutch members, i.e. in the case of balls as clutch members as a function of the ball diameter, on the one hand, and the possible displacing or swinging movement of the radial external marginal area of the clutch element into the direction towards the clutch part opposite the clutch element in the finally assembled state, on the other hand. Usually, the clutch parts themselves cannot be displaced in axial direction with respect to each other, but this can be possible. In order to duly connect the first and the second clutch part to each other in a load transmitting manner, the clutch members which are respectively carried by the one clutch part on the one hand and by the clutch element on the other hand have to be brought into engagement with respect to each other. Regarding the clutch according to the invention, this is realized by means of the clutch element, in that the radial external marginal area of the clutch element which carries the clutch members will be moved, i.e. displaced or swung by pneumatic, hydraulic or electric pressure influence for bridging the axial distance between the two clutch parts. Due to this deformation of the resilient-elastic area of the clutch element, the clutch members are caused to engage in each other and thus a load transmitting connection is established between the two clutch parts. In order to loosen again the thus formed connection between the clutch parts the pressure impingement on the radial external marginal area of the clutch element has to be minimized so far that the radial external marginal area can return or swing back into its normal position thanks to the resilient-elastic design of the intermediate area.

Other advantages and characteristics of the invention will become apparent from the following description by means of the figures. Herein:

FIG. 5 shows a cut side view of the first clutch part according to FIG. 2;

FIG. 6 shows a top view of the first clutch part according to FIG. 2 or FIG. 5;

FIG. 7 shows a cut side view of the clutch element according to FIG. 2 in an alternative embodiment and FIG. 8 shows a top view of the clutch element according to FIG. 7.

FIG. 1 is a schematic representation showing a clutch 1 according to the invention. For the reason of a better understanding, the representation according to FIG. 1 is simplified.

Figure 1:
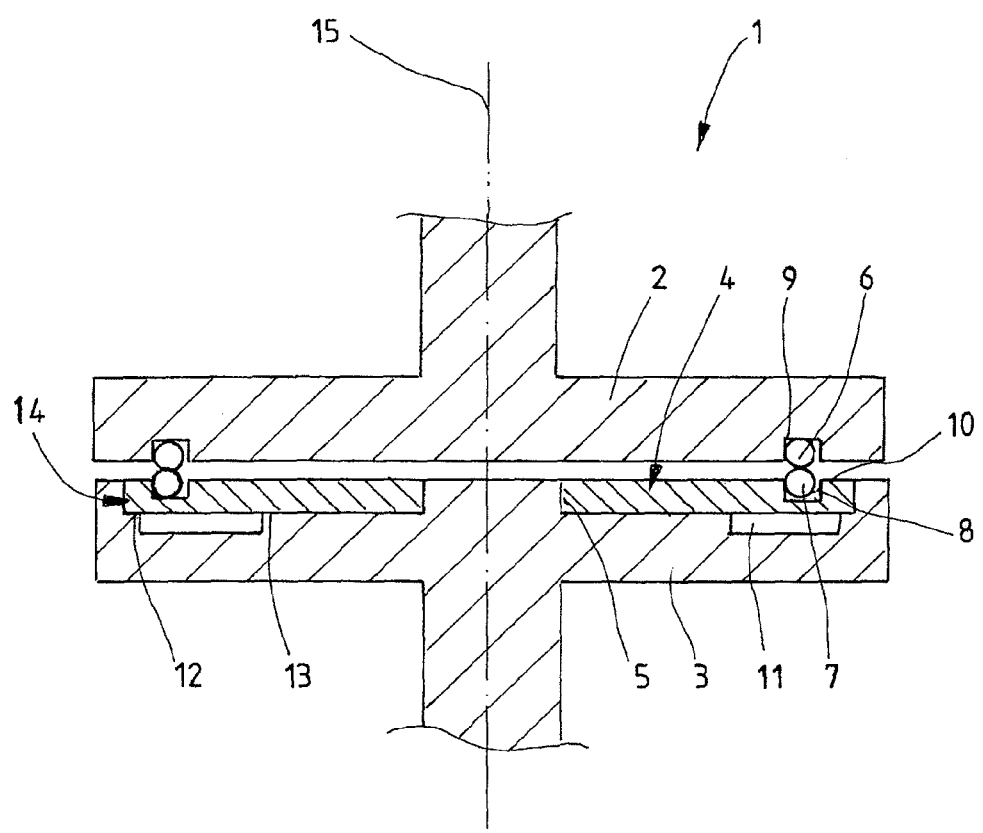
FIG. 1 shows a schematic cut view of the clutch according to the invention.

As it is visible in FIG. 1, the clutch according to the invention comprises a first clutch part 2 and a second clutch part 3. These two clutch parts 2 and 3 can be rotated relative to one another around a common axis 15. However, the two clutch parts 2 and 3 are positioned at a pre-determined fixed distance with respect to each other in the axial direction. A displacement or shifting of the clutch parts relative to each other in axial direction of the axis 15 is not possible.

Clutch members, namely first clutch members 6 and second clutch members 7 serve for a load transmitting rotational connection of the two clutch parts 2 and 3. For a load transmitting rotational connection of the first clutch part 2 and the second clutch part 3, the first clutch members 6 and the second clutch members 7 have to be brought into an interlocking and/or non-positive engagement. The clutch parts 2 and 3 are then positioned in a rotationally-fixed manner with respect to each other, such that a torque can be transmitted from the first clutch part 2 onto the second clutch part 3 and vice versa. As soon as the interlocking or non-positive connection between the clutch members is loosened again, the two clutch parts 2 and 3 can be again rotated relative to each other, i.e. in the loosened state of the clutch members a torque transmission from the first clutch part 2 onto the second clutch part 3 or vice versa will not be possible.

From the representation according to FIG. 1 it becomes apparent that the first clutch members 6 are carried by the first clutch part 2. For this purpose, the altogether disk-shaped first clutch part 2 comprises a bordering ring groove 9, into which the first clutch members 6 are inserted, preferably in a rotationally-fixed manner. In the shown exemplary embodiment according to FIG. 1, the first clutch members 6 are balls.

The second clutch members 7 are carried by an annular clutch element 4. For this purpose the clutch element 4 according to the invention comprises a bordering groove 8 in the radial external marginal area 10, into which groove the second clutch members 7 which are advantageously also balls are inserted, preferably in a rotationally-fixed manner. As it can be seen in the representation according to FIG. 1, the bordering groove 9 of the first clutch part 2 and the groove 8 of the clutch element 4 and thus the first clutch members and the second clutch members 7 are opposed to each other in the finally assembled state of the clutch 1.

The clutch element 4 is disposed in a rotationally-fixed manner on the second clutch part 3. This rotationally-fixed connection is realized by means of a polygonal connection 5. Herein, the second clutch part 3 comprises a receiver 14 having a shape corresponding to the geometric design of the clutch element 4, into which receiver the clutch element 4 is inserted in the finally assembled state, as it is visible in the representation according to FIG. 1. Herein, it goes without saying that the polygonal connection 5 can also be alternatively or complementarily formed on the face of the radial external marginal area 10 of the clutch element 4.

The polygonal connection 5 between the clutch element 4 and the second clutch part 3 is a shaft-hub connection, wherein it can be provided according to a special proposal of the invention that with respect to this connection several radial shoulders are provided in the longitudinal direction of the axis 15. This embodiment has the advantage that the maximum force which is generated in the course of a due load of the shaft-hub connection will be distributed to the individual radial shoulders. Thereby, the force generated in total in the load case is not minimized, but an optimized distribution of the maximally occurring force is achieved which advantageously enables to reduce the dimensions of the individual components which leads to a material advantage.

The second clutch part 3 provides a pressure chamber 11 between two shoulders 12 and 13, wherein the second clutch part 3 is also altogether shaped as a disk in accordance with the first clutch part 2, for which reason both the pressure chamber 11 and the shoulders 12 and 13 are respectively formed like an annular bordering.

As it becomes apparent from the representation according to FIG. 1, the pressure chamber 11 provided by the second clutch part 3 is formed beneath the radial external marginal area 10 of the clutch element 4 with respect to the drawing plane according to FIG. 1. This radial external marginal area 10 of the clutch element 4 is resilient-elastic and can be displaced or swung by a corresponding force impingement, namely upwards and downwards with respect to the drawing plane according to FIG. 1, i.e. towards the first clutch part 2 or away from this one.

The force impingement on the clutch element 4, i.e. the radial external marginal area 10 of the clutch element 4 is realized by means of hydraulic or pneumatic pressure influence via the pressure chamber 11. Inside the pressure chamber a pressure exceeding the minimum pressure will be generated which will then consequently lead to the fact that the radial external marginal area 10 arches upwards with respect to the drawing plane according to FIG. 1. As a result, the second clutch members 7 carried by the clutch element 4 are brought into due engagement with the first clutch members 6 carried by the first clutch part 2, which then leads to a load transmitting connection between the first clutch part 2 and the second clutch part 3. If this load transmitting, rotationally fixed connection of the first clutch part 2 and the second clutch part 3 shall be loosened again, the pressure prevailing in the pressure chamber 11 has to be reduced beneath a certain minimum pressure, as a result of which the radial external marginal area 10 of the clutch element 4 will be returned into the direction of the second clutch part 3 thanks to the resilient-elastic design of the radial external marginal area 10 of the clutch element 4. As a consequence of this return displacement or return swinging of the radial external marginal area 10 of the clutch element 4, the first clutch members 6 and the second clutch members 7 will be taken out of the engagement, such that the rotationally fixed connection between the first clutch part 2 and the second clutch part 3 will be loosened. In this loosened position the first clutch part 2 and the second clutch part 3 can again rotate relative to each other around the common axis 15.

FIGS. 2 through 6 show a special exemplary embodiment of the clutch according to the invention in the form of an indexing table 16, wherein the respective figures respectively show different components of the indexing table or different views of these components.

Figure 2:
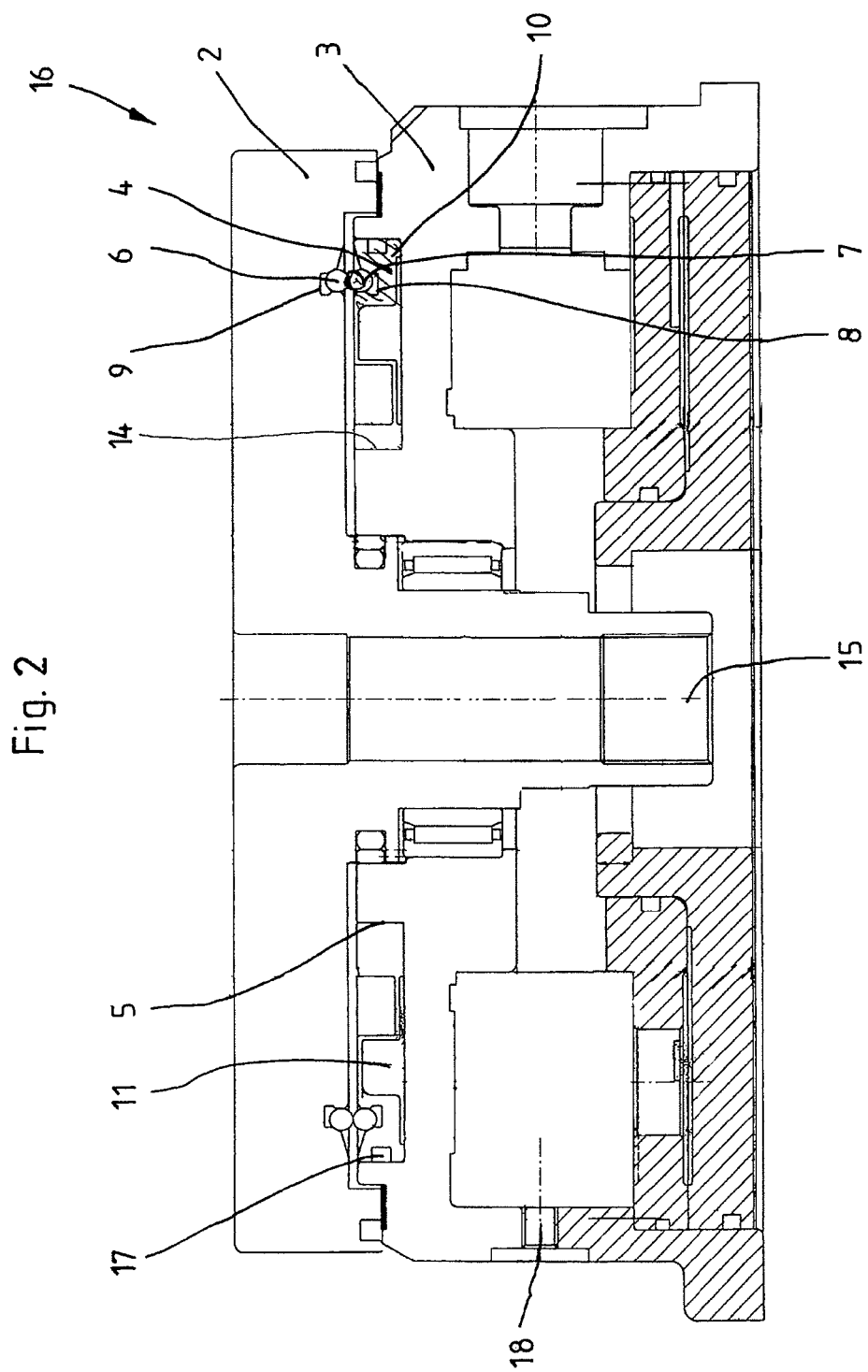
FIG. 2 shows a partially cut side view of the clutch according to the invention in the embodiment of an indexing table.

FIG. 2 is a survey showing an assembly drawing of the indexing table 16. This one comprises a first clutch part 2 which has to be designated as turntable according to this embodiment. The turntable, i.e. the first clutch part 2 can be rotated around an axis 15, namely relative to a fixed second clutch part 3 to be designated as housing according to this exemplary embodiment. In the embodiment according to FIG. 2 this has been structurally realized in that the first clutch part 2 is fixed at the second clutch part 3 in a rotational manner with respect to this one by means of a corresponding pivot bearing.

An annular clutch element 4 is disposed between the first clutch part 2 and the second clutch part 3 with respect to the drawing plane according to FIG. 2. This clutch element is inserted in a fluid tight manner into a receiver 14 of the second clutch part 3 provided for this. For the purpose of a fluid tight arrangement of the clutch element on the second clutch part 3, corresponding sealing elements are used, for instance a sealing element which is no further represented in the drawings and which is inserted into the front groove 14 of the clutch element 4.

The clutch element 4 is disposed in a rotationally fixed manner on the second clutch part 3 by means of a polygonal connection 5. As the second clutch part 3, the clutch element 4 is also disposed in a rotationally fixed manner with respect to the first clutch part 2. In other words: A rotation of the first clutch part 2 is realized with respect to the second clutch part 3 and thus also with respect to the clutch element 4 which is connected in a rotationally fixed manner to the second clutch part 3.

The clutch element 4 is provided with a bordering groove 8 in the radial external marginal area 10, into which groove second clutch members 7 in the form of balls are inserted. With respect to the drawing plane according to FIG. 2, a ring groove 9 is formed in the first clutch part 2 opposite said groove 8, into which groove 9 clutch members also in the form of balls are inserted. These clutch members 6 and 7 can be brought into engagement in the way already previously described by means of FIG. 1 for establishing a non-positive connection of the first clutch part 2 and the second clutch part 3.

The second clutch part 3 provides a pressure chamber 11 which can be filled with a fluid, for instance air or oil, via an inlet 18. As a consequence of the filling of the pressure chamber 11 with a fluid, the pressure inside the pressure chamber 11 increases which entails a force impingement on the bottom side of the radial external marginal area 10 of the clutch element 4 with respect to the drawing plane according to FIG. 2. Due to this force impingement, the radial external marginal area 10 of the clutch element 4 swings upwards with respect to the drawing plane according to FIG. 2 in the way already described by means of FIG. 1, which leads to an engagement of the first clutch members 6 and the second clutch members 7 with the consequence that the first clutch part is arrested in a rotationally fixed manner with respect to the second clutch part 3 and fixed to this one.

As it becomes apparent from the above description, the first clutch part 2 serving as turntable of the indexing table 16 can be clockwise rotated with respect to the second clutch part 3 serving as housing and be arrested in a rotationally fixed manner with respect to this one.

Figure 4:
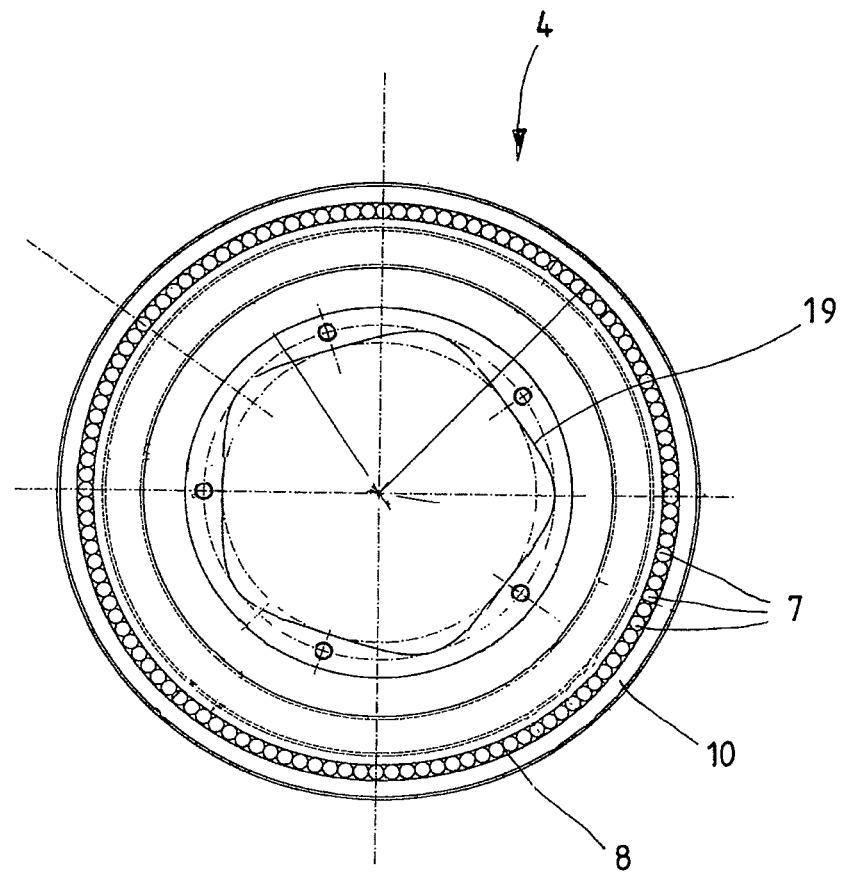
FIG. 4 shows a top view of the clutch element according to FIG. 2 or 3.
Figure 3:
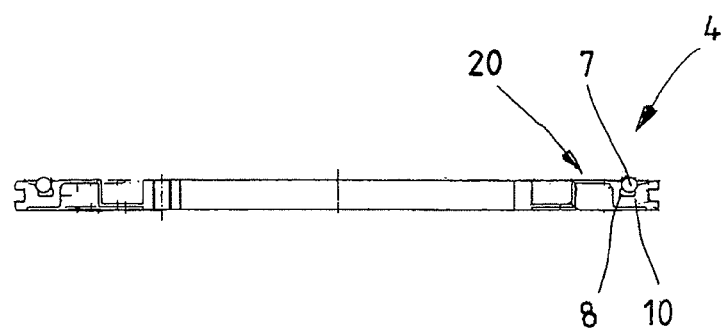
FIG. 3 shows a side view of the clutch element according to FIG. 2.

FIGS. 3 and 4 respectively show the clutch element 4 in an individual presentation. The polygonal contour 19 of the clutch element 4 which serves for establishing the polygonal connection 5 between the clutch element 4 and the second clutch part 3 is in particular disclosed in FIG. 4.

The resilient-elastic design of the radial external marginal area 10 of the clutch element 4 is achieved because of the reduced material consumption in the resilient area 20 of the clutch element 4 as this one is in particular disclosed in FIG. 3.

FIGS. 5 and 6 show two different views of the first clutch part 2 according to FIG. 2, wherein a top view from above is shown in FIG. 6.

FIGS. 7 and 8 respectively show a clutch element 4 according to an alternative embodiment. Herein, the clutch element 4 according to FIGS. 7 and 8 differs from the clutch element 4 according to FIGS. 3 and 4 by the design of the resilient area 20. In the embodiment according to FIGS. 7 and 8, this one is quasi a bordering groove 21 which comprises a bottom 22 arching upwards in the centre with respect to the drawing plane according to FIG. 7.

LIST OF REFERENCE NUMERALS

1 clutch
2 first clutch part
3 second clutch part
4 clutch element
5 polygonal connection
6 first clutch member
7 second clutch member
8 groove
9 ring groove
10 radial external marginal area
11 pressure chamber
12 shoulder
13 shoulder
14 receiver
15 axis
16 indexing table
17 front groove
18 inlet
19 contour
20 resilient area
21 groove
22 bottom

The invention claimed is:

1. A clutch comprising:
a first clutch part (2) and a second clutch part (3), wherein the two clutch parts (2, 3) are disposed rotatably relative to each other;
a clutch element (4) which is positioned rotationally-fixed relative to one of the two clutch parts (3),
wherein the other one of the two clutch parts (2) has a clutch member (6) which cooperates with a clutch member (7) carried by the clutch element (4),
wherein a polygonal connection is provided for a rotationally fixed connection between the clutch element (4) and the clutch part (3) and
wherein the one clutch part (3) receiving the clutch element (4) comprises a pressure chamber (11), wherein the clutch element (4) comprises a resilient-elastic area (20) in which the clutch member (7) is inserted.

2. A clutch according to claim 1, wherein the clutch element (4) is disposed on the one of the two clutch parts (3).

3. A clutch according to claim 1, wherein the clutch element (4) is annular.

4. A clutch according to claim 1, wherein the clutch member (7) carried by the clutch element (4) is a ball which is inserted into a bordering groove (8) in the radial external marginal area (10) of the clutch element (4).

5. A clutch according to claim 1, wherein the clutch element (4) is disposed in a correspondingly designed receiver (14) of the one clutch part (3).

6. A clutch according to claim 5, wherein the clutch element (4) is inserted in the receiver (14) in a fluid tight manner.

7. A clutch according to claim 1, wherein the other clutch part (2) comprises a bordering ring groove (9), into which the clutch member of the other clutch part (2) is inserted.

* * * * *